United States Patent [19]

Newkirk

[11] Patent Number: 4,664,051
[45] Date of Patent: May 12, 1987

[54] THREE WHEELER FLOTATION CONVERSION KIT

[75] Inventor: Michael W. Newkirk, Bald Knob, Ark.

[73] Assignee: Newell Corporation, Bald Knob, Ark.

[21] Appl. No.: 777,545

[22] Filed: Sep. 19, 1985

[51] Int. Cl.[4] .......................................... B63H 21/175
[52] U.S. Cl. ..................................... 114/123; 114/270; 280/295; 440/11; 440/12
[58] Field of Search ................... 114/123, 270; 440/11, 440/12; 280/293, 295, 10, 7.12, 12.12

[56] References Cited

U.S. PATENT DOCUMENTS

| | | |
|---|---|---|
| 547,422 | 10/1895 | Dean . |
| 587,074 | 7/1897 | Brazelton . |
| 1,380,319 | 5/1921 | Houseman et al. . |
| 1,943,564 | 1/1934 | Sturgell ................. 115/0.5 |
| 2,219,252 | 10/1940 | Coronello ............... 115/27 |
| 2,325,532 | 7/1943 | Miller ..................... 115/71 |
| 2,997,012 | 8/1961 | Özkök ..................... 115/0.5 |
| 3,486,477 | 12/1969 | Pender .................... 114/270 |
| 3,640,239 | 2/1972 | Petroskey ............... 440/12 |
| 4,050,399 | 9/1977 | Mochel ................... 440/12 |
| 4,522,420 | 6/1985 | Hannappel .............. 440/11 |

FOREIGN PATENT DOCUMENTS

| | | | |
|---|---|---|---|
| 79399 | 12/1962 | France .................... | 440/12 |
| 654891 | 8/1963 | Italy . | |
| 202152 | 12/1938 | Sweden .................. | 440/12 |

Primary Examiner—Joseph F. Peters, Jr.
Assistant Examiner—Thomas J. Brahan
Attorney, Agent, or Firm—Stephen D. Carver

[57] ABSTRACT

A conversion kit adapted to be retro-fitted to conventional three wheeled vehicles for floating them over water. The flotation kit includes a front frame assembly having a pair of rigid, elongated front frame members semi-permanently coupled to the front fork of the three wheeler in axial alignment with one another. A pair of front flotation devices each comprise a suitable mounting strut which is adapted to be telescopingly coaxially coupled to the front frame members. A rear frame assembly comprises a first rigid elongated rear frame strut which may be variably positioned to the vehicle, and a second lower rigid elongated frame strut which includes a central rigid portion and a pair of outer lateral portions telescopingly coaxially fitted to it. A pair of rigid rear flotation devices each include a rigid mounting strut adapted to be telescoped coaxially to the lateral portions of the second rear frame strut to secure the rear floats, whereby the flotation devices secure the three wheeler and add buoyancy in cooperation with the tires so that propulsion through water may be effectuated merely by rotation of the rear wheel. Importantly the conversion kit also includes a securing and transportation system whereby the floats, once removed, may be temporarily stored in a safe, out-of-the-way position convenient for driving the three wheeler over ground.

8 Claims, 10 Drawing Figures

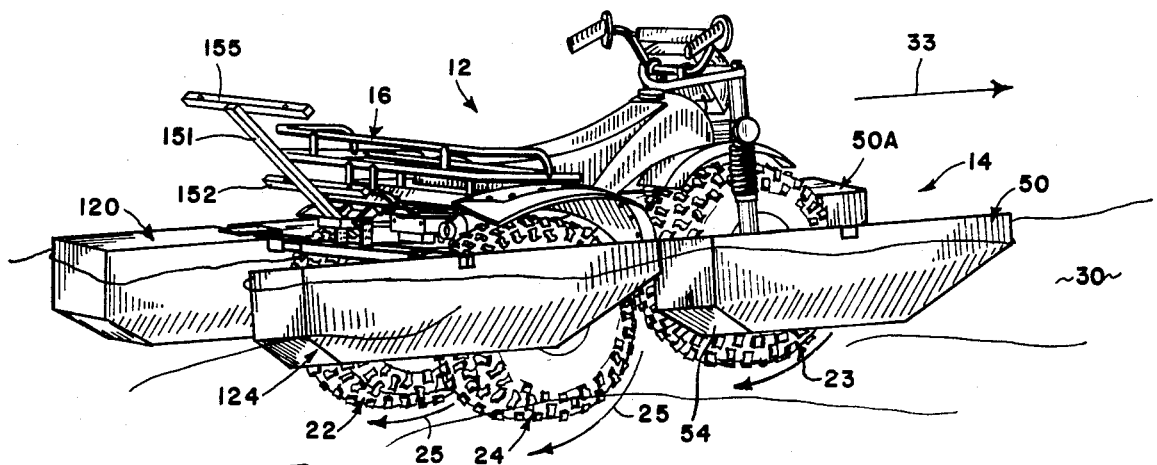
FIG.1
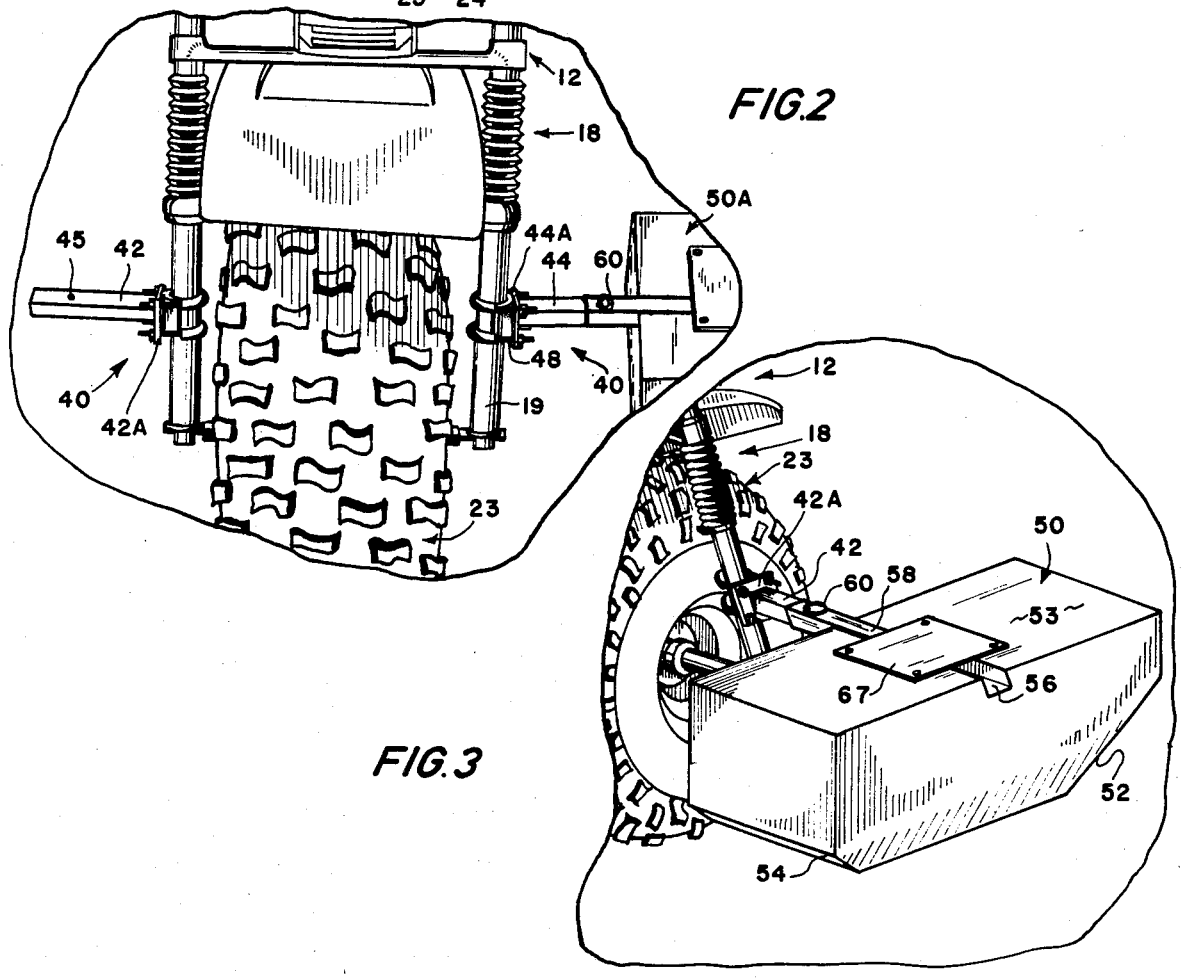
FIG.2
FIG.3

THREE WHEELER FLOTATION CONVERSION KIT

BACKGROUND OF THE INVENTION

The present invention relates generally to motorcycles, three wheelers and the like. More particularly, the present invention relates to a conversion kit adapted to be retro-fitted to conventional three wheelers for the operative flotation of same.

In the prior art it has previously been suggested to provide accessory means for floating motorcycles or similar vehicles. For example, U.S. Pat. No. 4,050,399 issued to Mochel on Sept. 27, 1977 discloses a float system upon which a conventional motorcycle is secured, and which is propelled through water by rearwardly mounted propellers which are driven by the motorcycle rear wheel through suitable mechanical linkage. Brazelton U.S. Pat. No. 587,074 issued July 27, 1897 discloses a similar system. U.S. Pat. No. 2,219,252 issued Oct. 22, 1940 discloses an extremely complex system whereby a bicycle is floated over water upon a platform disposed over a pair of spaced-apart floats. U.S. Pat. Nos. 547,422; 2,997,012; 1,380,319; 1,943,564; and, 2,325,532 all disclose means of floating and adapting automobiles for self-propelled flotation. Italian Pat. No. 654,891 issued in 1963 is similar.

However, none of the prior art known to me discloses a flotation system which is adapted to be retro-fitted to a three wheeled motorcycle (i.e. hereinafter referred to as a "three wheeler.") Moreover, the prior art has not disclosed the concept of suitably floating a three wheeler by retro-fitting an appropriate flotation conversion kit whereby to enable the rear wheels the a motorcycle or a three wheeler to directly drive the apparatus without interconnection to auxiliary pulleys, linkages or the like.

SUMMARY OF THE INVENTION

The present invention comprises a flotation conversion kit adapted to be retro-fitted to conventional three wheelers.

The preferred conversion kit comprises a front frame assembly consisting of a pair of rigid elongated front frame members adapted to be permanently coupled at opposite sides of the front fork of the three wheeler. A pair of front flotation devices are coupled on opposite sides of the front wheel of the vehicle to the front frame members in generally parallel, spaced-apart relation relative to the front wheel. These front flotation devices are essentially oriented parallel with the front wheel, and are steered in conjunction with twisting of the front fork and resultant normal steering of the vehicle.

A rear frame assembly includes an elongated rear frame strut which is adapted to be variably positioned relative to the three wheeler frame. A second rear frame strut is secured parallel to and below the first rear frame strut, and it includes a pair of elongated lateral portions extending telescopically into its interior. The latter elongated lateral portions may be easily telescoped to a desired configuration, whereupon they are suitably pinned into a semi-permanent position. A pair of rear flotation devices, which are similar to the front floats but which are somewhat larger, are then semi-permanently pinned to the rear frame strut lateral portions.

When the apparatus is assembled as described, the three wheeler may be driven into a pond, lake or the like and buoyancy will be provided by the float members of the present conversion kit in conjunction with the three wheels (i.e. tires) of the vehicle. Propulsion across the water surface will be provided by the rotating rear wheels of the vehicle. Steering will be facilitated by the combination of the front floats with the front fork and wheel. Importantly, auxiliary propellers or the like will be unnecessary.

When the operator of the three wheeler is traveling either to or from the body of water which he wishes to traverse, he may store the individual float members by temporarily securing them to a rear portion of the kit. The floats need merely be pinned to the kit at the three wheeler rear, where they will be disposed in a generally vertical out-of-the way position.

Therefore a basic object of the present invention is to provide a conversion flotation kit for three wheelers.

Another fundamental object of the present invention is to provide a flotation kit of the character described which is adapted to facilitate propulsion over water by the rear wheels of the three wheeler, without the use of auxiliary propellers, linkages, screws, or the like.

A similar object of the present invention is to provide a flotation kit for three wheeled motorcycles which obviates the necessity of including energy wasting accessory transmissions, drive shafts, gears, propellers, chains, sprockets or the like.

A still further object of the present invention is to provide a flotation conversion kit which may be retro-fitted to a wide variety of conventional three wheelers.

A similar object of the present invention is to provide a flotation kit of the character described which may be quickly deployed by the user in a dependable, safe and reliable manner.

Yet another object of the present invention is to provide a flotation kit which may be retro-fitted to three wheeled motorcycles which insures dependable steering and vehicle control when in the water.

Yet another object of the present invention is to provide a flotation kit of the character described which may be conveniently deployed in a transportable position.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 1 is an isometric view of a conventional three wheeler upon which the flotation conversion kit of the present invention has been properly operationally installed, wherein the three wheeler is illustrated traveling over water;

FIG. 2 is an enlarged, fragmentary, isometric view illustrating a portion of the front fork of the three wheeler, and the front frame assembly of the flotation conversion kit;

FIG. 3 is an enlarged, fragmentary, isometric view showing the right front frame assembly and its associated front flotation device;

DETAILED DESCRIPTION OF THE DRAWINGS

Figure 4:
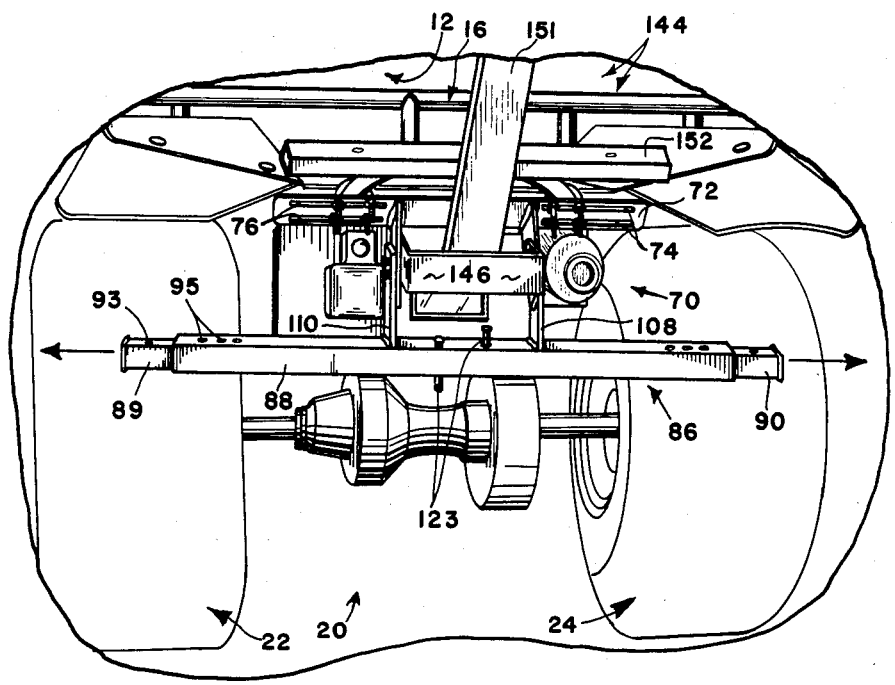
FIG. 4 is a fragmentary, rear, isometric view illustrating the rear frame assembly, with portions thereof omitted for brevity.

With reference now directed to FIGS. 1-6 of the appended drawings, a conventional three wheeled all terrain vehicle or ATV has been generally designated by the reference numeral 12. Three wheeler 12 is illustrated fitted with a flotation conversion kit constructed in accordance with the best mode of the present invention. The instant kit has been generally designated by the reference numeral 14.

Three wheeler 12 includes a rigid frame, generally designated by the reference numeral 16, a front fork assembly generally designated by the reference numeral 18 (FIG. 2), and a rear generally designated by the reference numeral 20. A conventional internal combustion engine powers the three wheeler 12, and the rear wheels 22 and 24 of course propel it. The front fork apparatus includes a front wheel 23 which is conventionally rotatably journalled within the fork assembly 18 to effectuate balance and steering.

Once installed, the flotation kit 14 enables the three wheeler 12 to properly float upon water 30 (FIG. 1), and the kit-equipped three wheeler 12 may thus move in the direction of arrow 33 in response to clockwise (as viewed in FIG. 1) rotation of its rear drive wheels 22 and 24, which may rotate as indicated generally by arrows 25. In other words, employment of the conversion kit 14 facilitates movement of the three wheeler 12 through the water without the use of accessory propellers or the like, since I have found that by constructing the flotation members in the manner to be hereinafter described flotation of the three wheeler is facilitated along with propulsion through its standard rear wheels.

With reference particularly directed to FIGS. 1 through 3, the front frame assembly of the present conversion kit 14 has been generally designated by the reference numeral 40. The front frame assembly comprises a pair of rigid, elongated front frame members 42 and 44 which are secured on opposite sides of the vehicle fork assembly 18. In particular, each front frame member is comprised of generally square tubular steel stock, and terminates in a rigid mounting plate 42A, 44A respectively. A pair of U-clamps such as clamps 48 (FIG. 2) surround the elongated suspension member 19 and are bolted to plate 44A to substantially permanently secure the front frame members 44 and 42 on opposite sides of the wheel 23 in generally axial alignment with one another.

A pair of front flotation devices are installed on opposite sides of the front fork assembly 18 to float the front of the three wheeler 12. With reference to FIG. 3, each of the front flotation devices comprises a preferably plastic flotation member 50, generally in the shape of a parallelepiped, including a front inclined bottom 52 and a similarly inclined rear 54. The top 53 of each front flotation member includes a central transverse groove 56 which is adapted to receive a tubular mounting strut 58. Tubular mounting strut 58 is adapted to be fitted to the front frame member 42 in coaxial relation therewith. In particular it will be noted that a conventional fastening pin 60 may be installed through suitable aligned orifices such as orifice 45 in member 42) to temporarily fasten the float assembly to the front of the three wheeler. Strut 58 is secured to the float 50 within channel 56 in which it is positioned, and it is further braced by a generally planar cover plate 67 which is firmly attached to the top 53 of float 50. It will be appreciated from a comparison of FIGS. 2 and 3 that the right front float 50 is virtually the mirror image of the left front float 50A.

Figure 5:
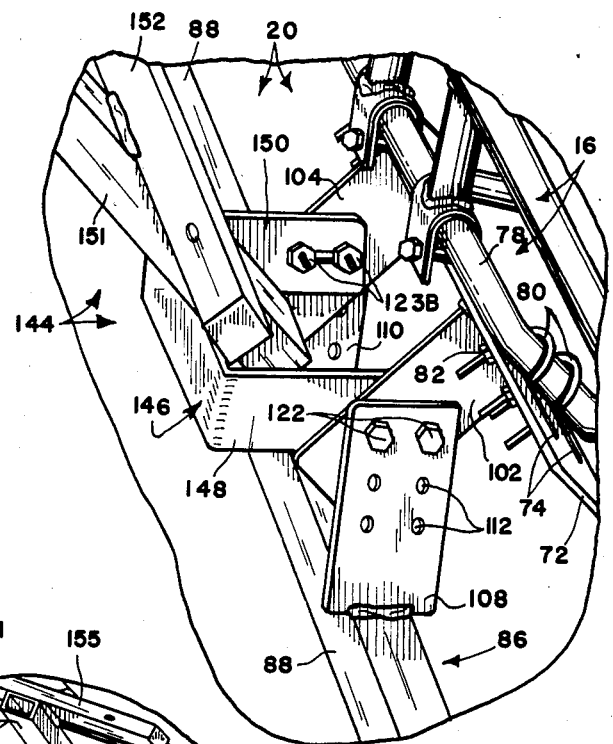
FIG. 5 is an enlarged, fragmentary, isometric view illustrating the rear frame assembly.
Figure 6:
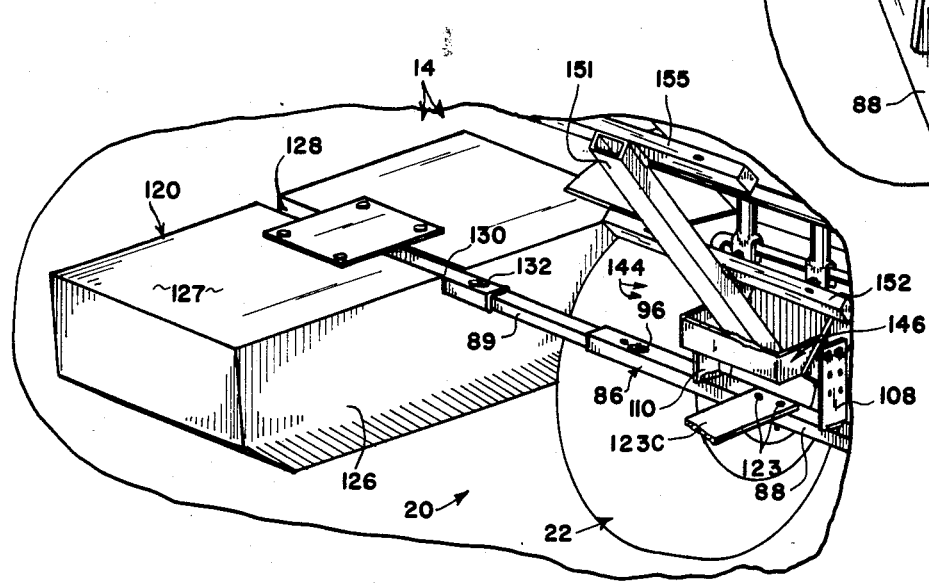
FIG. 6 is an enlarged, fragmentary, isometric view illustrating a portion of the rear frame assembly and the left rear float.
Figure 7:
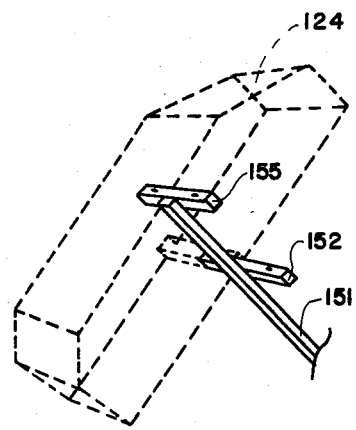
FIG. 7 is a fragmentary, isometric view of a portion of the rear frame assembly float transportation and storage system; with the position of one of the rear floats shown in dashed lines.
Figure 8:
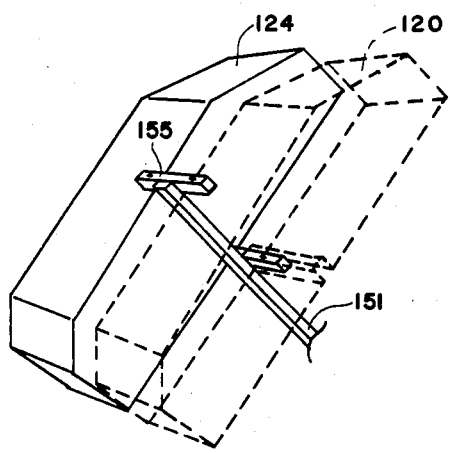
FIG. 8 is a view similar to FIG. 7, but showing the first rear float semi-permanently installed, with the desired position of the second rear float shown in dashed lines.
Figure 9:
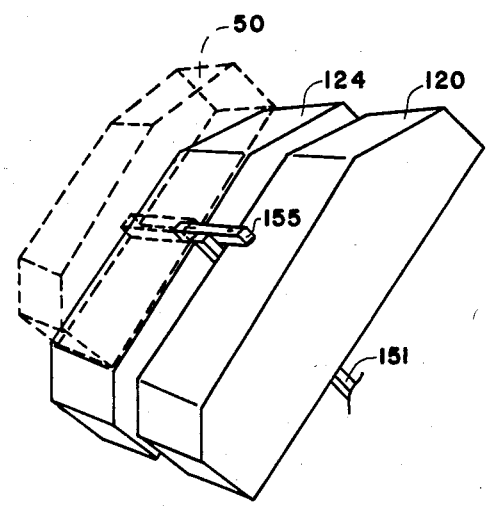
FIG. 9 is an isometric view similar to FIGS. 7 and 8, with both rear floats shown properly installed in a transportable position, and with one of the front floats shown in a desired position about to be coupled to the apparatus shown in dashed lines; and, FIG. 10 is a view similar to FIGS. 7-9, showing the rear floats and one front float semi-permanently attached, and with the final position of the remaining front float shown in dashed lines.
Figure 10:
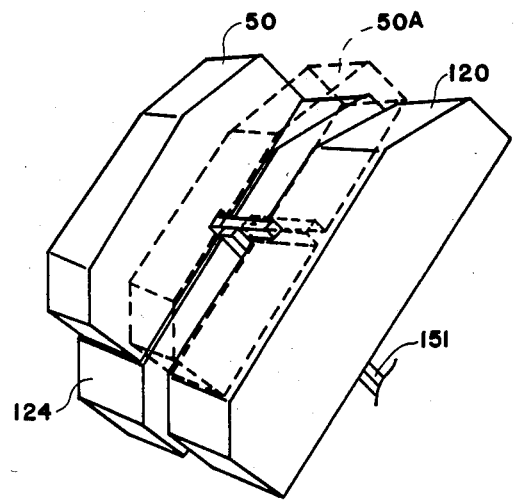

With reference primarily directed now to FIGS. 4 through 6, the rear frame assembly of the present invention has been generally designated by the reference numeral 70. Assembly 70 includes a rigid, elongated, generally rectangular first frame strut 72. This flat rectangular strut 72 includes a first pair of mounting slots 74 spaced apart from a second pair of cooperating mounting slots 76. These slots facilitate the mounting of the flat member 72 against an inclined frame member 78 of the vehicle 12. A plurality of U-clamps 80 are employed in conjunction with conventional nuts 82 to securely mount rear frame strut 72 in a centered location relative to the rear of the vehicle 12. As will be appreciated from an inspection of FIGS. 4 and 5, once the strut 72 is appropriately centered relative to the rear of the vehicle, nuts 82 should be firmly tightened.

A second rigid elongated rear frame strut has been generally designated by the reference numeral 86. Strut 86 is adapted to be positioned generally below and away from the cooperating strut 72. Strut 86 is of rigid, generally rectangular bar stock steel. It includes a rigid, central tubular portion 88 and a pair of cooperating lateral portions 89 and 90 which are telescopingly received within opposite ends of central portion 88. As best viewed in FIG. 4, a plurality of apertures such as apertures 93, 95 are defined in the various members 89, 90 so that once the lateral members 89 and/or 90 are positioned as will hereinafter be described, they may be semi-permanently fastened in a desired orientation through conventional pins or clasps, such as pin 96 (FIG. 6).

As best seen in FIGS. 4 and 5, the first rear frame strut 72 includes a pair of spaced apart, rigid, centrally positioned tabs 102, 104 which are rigidly welded to it and which extend perpendicularly away from the strut 72 at a generally 45 degree angle relative to ground. These tabs 102 and 104 include suitable apertures. The central portion 88 of the second rear frame strut 86 includes a pair of rigid, upwardly extending generally rectangular, rigid mounting tabs 108 and 110 which include a plurality of rows of orifices, generally designated by the reference numeral 112. It will be apparent that these generally perpendicular tabs 110 and 108 are adapted to be disposed on opposite outer sides of the tabs 102 and 104 projecting from the first rear frame strut 72. In this manner the lower second rear frame strut 86 is semi-permanently attached to the frame of the vehicle 12. It will be apparent that by suitably positioning the orifices 112 vertically relative to the frame, subsequent attachment of conventional mounting bolts 122 and conventional nuts 123B will appropriately fasten the rear frame apparatus in semi-permanent relation together.

As best viewed in FIGS. 1 and 6, a pair of rear flotation members, generally designated by the reference numerals 120 and 124, are adapted to be fastened to the vehicle 12 by connection to the rear frame assembly previously described. Each of the flotation systems 120 and 124 are substantial mirror images of one another. Assembly 120, for example, includes a plastic float 126 of generally parallelepiped geometry, which has an upper surface 127 equipped with a channel 128 in which a suitable mounting strut 130 is permanently secured. This mounting strut 130 is similar to the front mounting struts 58 (FIG. 3) previously discussed. Strut 130 is thus coaxially received about the lateral member 89 of the second rear frame strut 86. It is similarly pinned in position by a desired pin such as pin 132 (FIG. 6). Once both of the rear flotation members 120, 124 are suitably pinned on opposite sides of the rear frame assembly flotation when in the water will proceed.

Importantly, the conversion kit 14 includes rigid means associated therewith for temporarily securing and transporting the front and rear flotation members between land and water. This provides an ideal and convenient mode of traveling over land while carrying the flotation members for subsequent water borne deployment. With reference again to FIGS. 4 through 6, a system for securing and temporarily transporting the flotation devices has been generally designated by the reference numeral 144. System 144 includes a rigid generally U-shaped brace 146 which includes a pair of sides 148 and 150 which are secured by bolts 122 and nuts 124 previously described. To this effect it will be appreciated that brace sides 148 and 150 are maintained in upper orientation between the tabs 104 and 102 previously described. As elongated, rigid brace 151 secured to brace 146 projects rearwardly upwardly away from the rear of the motorcycle 12. This brace 151 supports a first rigid, transverse crosspiece 152 and terminates in a second crosspiece 155 of lesser length than crosspiece 152. Crosspiece 152 is spaced apart from crosspiece 155 such that the front and rear flotation members may be temporarily stored upon the securing and transportation system 144. Crosspieces 152 and 155 are both welded to brace 151, and they are centered with respect to brace 151 in generally perpendicularly bisecting relation therewith.

With reference now to FIGS. 7 through 10, in actual operation prior to transporting the flotation members it has been found desirable in practice to first install one of the lower flotation members such as member 124. The member 124 is oriented generally angularly relative to the vehicle 12, and its mounting strut 58 is coaxially coupled to strut 152 and pinned thereto in the same manner in which it may be pinned to the front frame assembly. Similarly, the opposite rear flotation member 120 is pinned upon the opposite side of the first crosspiece 152. Then the front flotation members 50, 50A are sequentially installed by attaching their mounting struts to the second crosspiece 155, as illustrated generally in FIGS. 9 and 10.

Thus if the flotation members are secured for transportation as hereinabove described, the three wheeler 12 may be conventionally driven over ground in any desired manner. It will also be appreciated that while so transporting the flotation members, the driver of the vehicle will be protected in the event that the vehicle rotates or twists backwards, since the transported flotation members will be interposed between the rear of the frame and the driver in the case of an accident.

When the driver reaches a suitable body of water through or upon which he wishes to travel, each of the flotation members need merely be unpinned from their storage position, and then quickly pinned upon the previously described frame structures for subsequent flotation. Pins 123 (FIG. 4) are associated with rear frame member 88 to facilitate the optional attachment of a suitable trailer or the like to be towed. The tongue portion 123C of a suitable trailer is illustrated attached to frame member 86 by pins 123.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A flotation conversion kit adapted to be fitted to a conventional all terrain vehicle of the type having a frame, a pair of rear drive wheels, and a front wheel assembly, said conversion kit comprising:

a front frame assembly comprising:
 a pair of rigid, elongated front frame members adapted to be permanently coupled to said ATV at opposite sides of said front wheel assembly in substantially axial alignment with one another;
 a pair of front flotation devices each comprising a float and a mounting strut rigidly coupled to said float, each mounting strut adapted to be selectively coaxially coupled to said front frame members;

a rear frame assembly comprising:
 a first rigid, elongated rear frame strut adapted to be permanently coupled to the frame of said ATV at the rear thereof, said first rear frame strut including slot means permitting variable positioning thereof relative to said ATV frame; and a first pair of rigid, parallel, spaced-apart, aperture-equipped mounting tabs projecting rearwardly and downwardly relative to said vehicle;
 a second, rigid elongated rear frame strut adapted to be secured in spaced apart relation with respect to said first rear frame strut below and parallel therewith, said second rear frame strut including a central portion, a pair of elongated lateral portions extensibly coaxially coupled to said central portion on opposite sides thereof, a pair of generally vertically disposed, rigid, parallel, spaced-apart mounting tabs each equipped with a second plurality of apertures; whereby said first pair of mounting tabs may be rigidly coupled to said second pair of mounting tabs by appropriately aligning selected first rear frame strut apertures with selected second frame strut apertures to receive suitable bolts or the like;

a pair of rear floats adapted to be selectively coupled to said lateral portions of said second rear frame strut;

whereby said front and rear floats cooperate, when installed upon said ATV to float same with said rear wheels appropriately positioned relative to water such that rotation thereof drives the ATV through water and such that no auxiliary rudders, propellers, screws, or paddles are necessitated; and, means for securing and transporting said front and rear floats generally above the rear of said ATV when they are uncoupled from said front or rear frame assemblies.

2. The conversion kit as defined in claim 1 wherein said means for securing and transporting said front and rear floats comprises:

brace means adapted to be permanently rigidly coupled to said rear frame assembly in association with said first and second pairs of spaced apart mounting tabs;

elongated support means secured to and extending rearwardly and upwardly from said brace means at the center thereof;

a first cross piece rigidly secured to said elongated support means in perpendicular bisecting relation relative thereto;

a second cross piece rigidly secured to said elongated support means in perpendicular bisecting relation relative thereto above said first cross piece; and, whereby said front pair of floats may be coupled to said transporting means second cross piece and said rear pair of floats may be coupled to said transportation means first cross piece below said front pair of floats.

3. The flotation conversion kit as defined in claim 1 wherein each of said front frame members comprises a rigid, elongated, generally tubular member which terminates in a rigid mounting plate adapted to be coupled to the front vehicle fork assembly with a first plurality of U-clamps.

4. The flotation conversion kit as defined in claim 3 wherein said front floats comprise plastic floats of generally parallelepiped configuration adapted to be temporarily secured by means of pins in coaxial relation to the front frame member upon said front mounting strut.

5. The flotation conversion kit as defined in claim 4 wherein said rear floats comprise plastic floats of generally parallelepiped configuration adapted to be temporarily secured by means of pins in coaxial relation to the rear frame member upon said rear mounting struts.

6. The flotation conversion kit as defined in claim 5 wherein said floats are so positioned upon said mounting struts so as to permit directional control of the vehicle by normal steering manipulation of said front fork and wheel without the use of auxiliary paddles, rudders, oars, or other conventional nautical steering devices.

7. The flotation conversion kit as defined in claim 6 wherein said floats are so positioned upon said mounting struts so as to permit propulsion of the vehicle through the water without the use of auxiliary paddles, rudders, oars, propellers, or screws.

8. The conversion kit as defined in claim 1 wherein said means for securing and transporting said front and rear floats comprises:

brace means adapted to be permanently rigidly coupled to said rear frame assembly in association with said first and second pairs of spaced apart mounting tabs;

elongated support means secured to and extending rearwardly and upwardly from said brace means at the center thereof;

a first cross piece rigidly secured to said elongated support means in perpendicular bisecting relation relative thereto;

a second cross piece rigidly secured to said elongated support means in perpendicular bisecting relation relative thereto above said first cross piece; and, whereby said front pair of floats may be coupled to said transporting means second cross piece and said rear pair of floats may be coupled to said transportation means first cross piece below said front pair of floats.

* * * * *